(12) United States Patent
Roy et al.

(10) Patent No.: US 11,551,677 B2
(45) Date of Patent: Jan. 10, 2023

(54) METHOD AND APPARATUS FOR AUTOMATIC CATEGORIZATION OF CALLS IN A CALL CENTER ENVIRONMENT

(71) Applicant: Uniphore Software Systems, Inc., Palo Alto, CA (US)

(72) Inventors: Somnath Roy, Chennai (IN); Samith Ramachandran, Palo Alto, CA (US); Umesh Sachdev, Palo Alto, CA (US)

(73) Assignee: Uniphore Software Systems, Inc., Palo Alto, CA (US)

( * ) Notice: Subject to any disclaimer, the term of this patent is extended or adjusted under 35 U.S.C. 154(b) by 145 days.

(21) Appl. No.: 16/808,219

(22) Filed: Mar. 3, 2020

(65) Prior Publication Data

US 2021/0210080 A1    Jul. 8, 2021

(51) Int. Cl.
*G10L 15/19* (2013.01)
*G10L 15/197* (2013.01)
*G06F 3/16* (2006.01)
*G10L 15/22* (2006.01)

(52) U.S. Cl.
CPC ............ *G10L 15/197* (2013.01); *G06F 3/167* (2013.01); *G10L 15/22* (2013.01)

(58) Field of Classification Search
USPC ................................. 704/235, 240, 245–247
See application file for complete search history.

(56) References Cited

U.S. PATENT DOCUMENTS

| | | | |
|---|---|---|---|
| 2009/0132442 A1* | 5/2009 | Subramaniam | G06F 40/35 706/12 |
| 2015/0154956 A1* | 6/2015 | Brown | G06F 16/353 704/235 |
| 2015/0194149 A1* | 7/2015 | Faizakof | G10L 15/1815 704/257 |
| 2015/0350438 A1* | 12/2015 | Arslan | G10L 25/93 379/88.01 |
| 2016/0012818 A1* | 1/2016 | Faizakof | G06F 16/285 704/245 |
| 2018/0067924 A1* | 3/2018 | Faizakof | G10L 15/1815 |
| 2018/0102126 A1* | 4/2018 | Faizakof | G10L 15/063 |
| 2020/0311738 A1* | 10/2020 | Gupta | G06F 16/285 |
| 2020/0394509 A1* | 12/2020 | Thomas | G06N 3/0445 |

\* cited by examiner

*Primary Examiner* — Leonard Saint-Cyr
(74) *Attorney, Agent, or Firm* — Praveer K. Gupta

(57) ABSTRACT

A system for categorizing a call between an agent and a caller comprises at least one processor and a memory communicably coupled to the at least one processor. The memory comprises computer executable instructions, which, when executed by the at least one processor implement a method as follows. A call document comprising text of the call between the agent and the caller is received by the system. The system categorizes the call into at least one class using regressive probability analysis of the call document. The system splits the call document to at least two portions, the at least two portions comprising a call header and a call body, and thereafter, using rule-based entity extraction, the system extracts a mandatory entity from the call header and an optional entity from the call body.

15 Claims, 7 Drawing Sheets

METHOD AND APPARATUS FOR AUTOMATIC CATEGORIZATION OF CALLS IN A CALL CENTER ENVIRONMENT

CROSS-REFERENCE TO RELATED APPLICATIONS

The present invention claims the benefit of the Indian Patent Application No. 202011000468, filed on Jan. 6, 2020, which is incorporated by reference herein.

FIELD

The present invention relates generally to improving call center computing and management systems, and particularly to extraction of call entities, and determination of a call category from text data of a voice call.

BACKGROUND

Several businesses need to provide support to its customers, which is provided by a customer care call center. Customers place a call to the call center, where customer service agents address and resolve customer issues. Computerized call management systems are customarily used to assist in logging the calls, and implementing resolution of customer issues. An agent, who is a user of a computerized call management system, is required to capture the issues accurately and plan a resolution to the satisfaction of the customer. In order to do so, the agent is required to capture the details regarding the call and the customer accurately, and particularly, identify various entities discussed in a call, and categorize the call according to predefined criteria.

A continuous stream of calls, complexity of the content of calls, among other factors significantly increase the cognitive load on the agent, and in most cases, increase the after call workload (ACW) for the agent. While several techniques to assist in call categorization exist, the currently known techniques are unable to provide a reasonably accurate categorization consistently.

Therefore, there exists a need for improving the state of the art in call categorization.

SUMMARY

The present invention provides a method and an apparatus for automatic categorization of a call in a call center environment, substantially as shown in and/or described in connection with at least one of the figures, as set forth more completely in the claims. These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a method and an apparatus for automatic call categorization in a call center environment. An automatic call categorization apparatus comprises a call to text processing engine, which is implemented on one or more computers. The engine is configured to diarize or transcribe audio data from a call when the call is active, and generate text data of the call. In some embodiments, the text data is generated as the parties on the call (for example, a customer and an agent) speak, and in some embodiments, the text data is generated passively, that is well after the call is concluded. The audio of such speech is converted to text using automatic speech recognition (ASR) techniques. The text is referred to as diarized text, and is annotated with "customer" or "agent" to indicate whether such text corresponds to the speech of the customer or the agent, as recognized by the engine.

The diarized text is divided into a header section, a body section and a tail section. The header section is used to extract one or more mandatory entities, while the body section and the broadest category of the call are used to extract one or more optional entities. The broadest call category, the mandatory entities and the optional entities extracted in this manner are displayed in a graphical user interface (GUI) as call summary.

A call categorization module calculates the probability of the call belonging to a narrowest category from a predefined set of narrowest categories, based on predefined phrases occurring in the diarized text. Based on a determination of the narrowest level category, a regressive probability calculation is made for a category at a next broader level than the narrowest category, and the process is repeated regressively, till the probability calculation for a category at a predefined higher level is made. Based on the probability scores, the call is assigned the categories calculated at each level.

In some embodiments, the audio data from the call is transcribed to text data, as soon as possible, including while the call is under progress, and language processing techniques are used to process the text as soon as possible, depending on as and when processable text becomes available. In some embodiments, most processing steps (e.g., generation of diarized text, probability calculation) are executed as soon as possible. In some other embodiments, one or more steps are implemented at a later time. In some embodiments, the steps disclosed hereinabove are implemented for multiple calls in single batch.

Figure 1A:
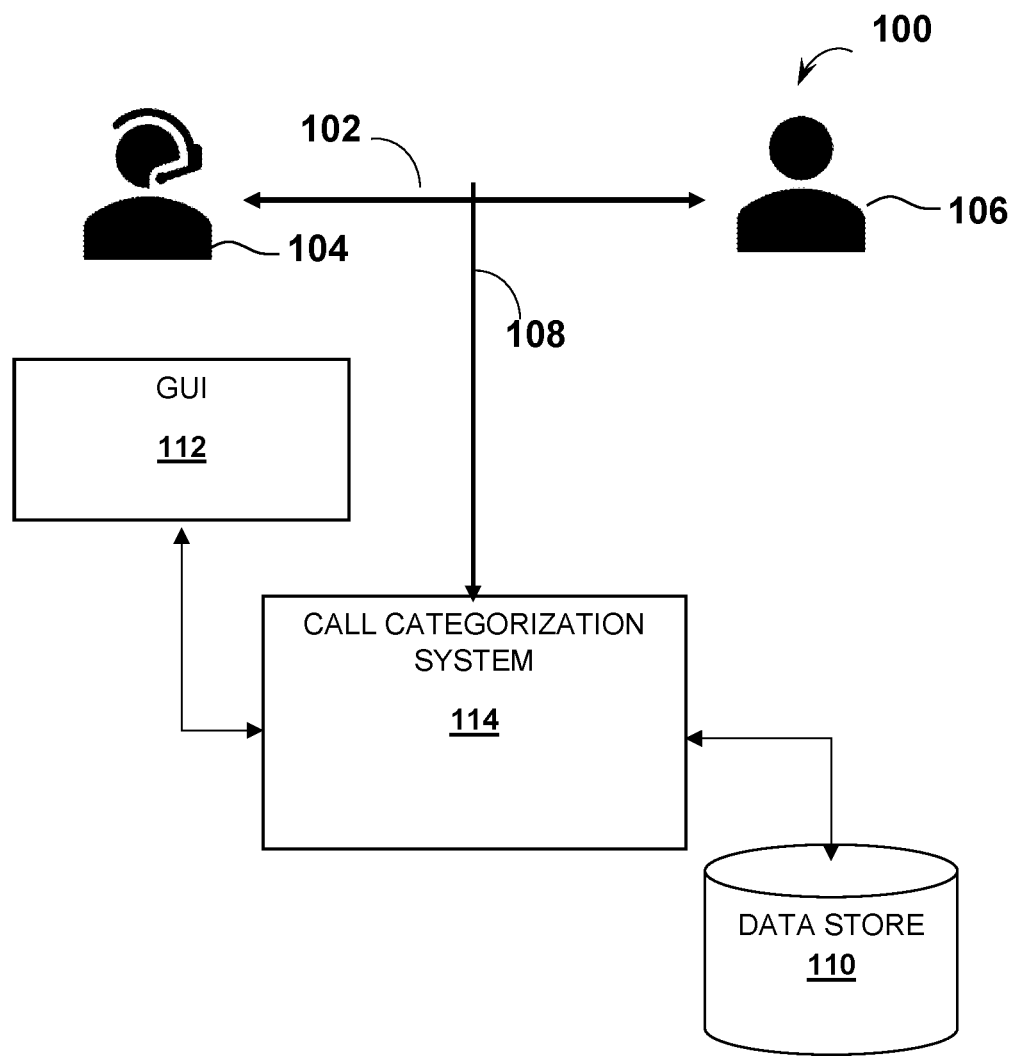
FIG. 1A is a schematic diagram depicting an environment for automatic call categorization, in accordance with an embodiment of the present invention.

FIG. 1A is a schematic diagram depicting an environment for automatic call categorization, in accordance with an embodiment of the present invention. An automatic call categorization apparatus 100 is deployed, for example, in a call center. The apparatus 100 comprises a voice (audio) call 102 between an agent 104 and a customer 106, on which the agent 104 and the customer 106 speak. The conversation between the agent 104 and the customer 106 over the voice call 102 is captured as an audio data stream 108, which is sent to an automatic call categorization system 114. In an embodiment, the audio data from the audio data stream 108 is stored, by the call categorization system 114, in a remote data store 110.

The automatic call categorization system 114 receives the live audio data stream 108 from a live call 102 between the agent 104 and the customer 106. As will be discussed further, the system 114 extracts one or more of the broadest call category, the mandatory entities and the optional entities, and displays the information on a graphical user interface (GUI) 112, as a call summary.

Figure 1B:
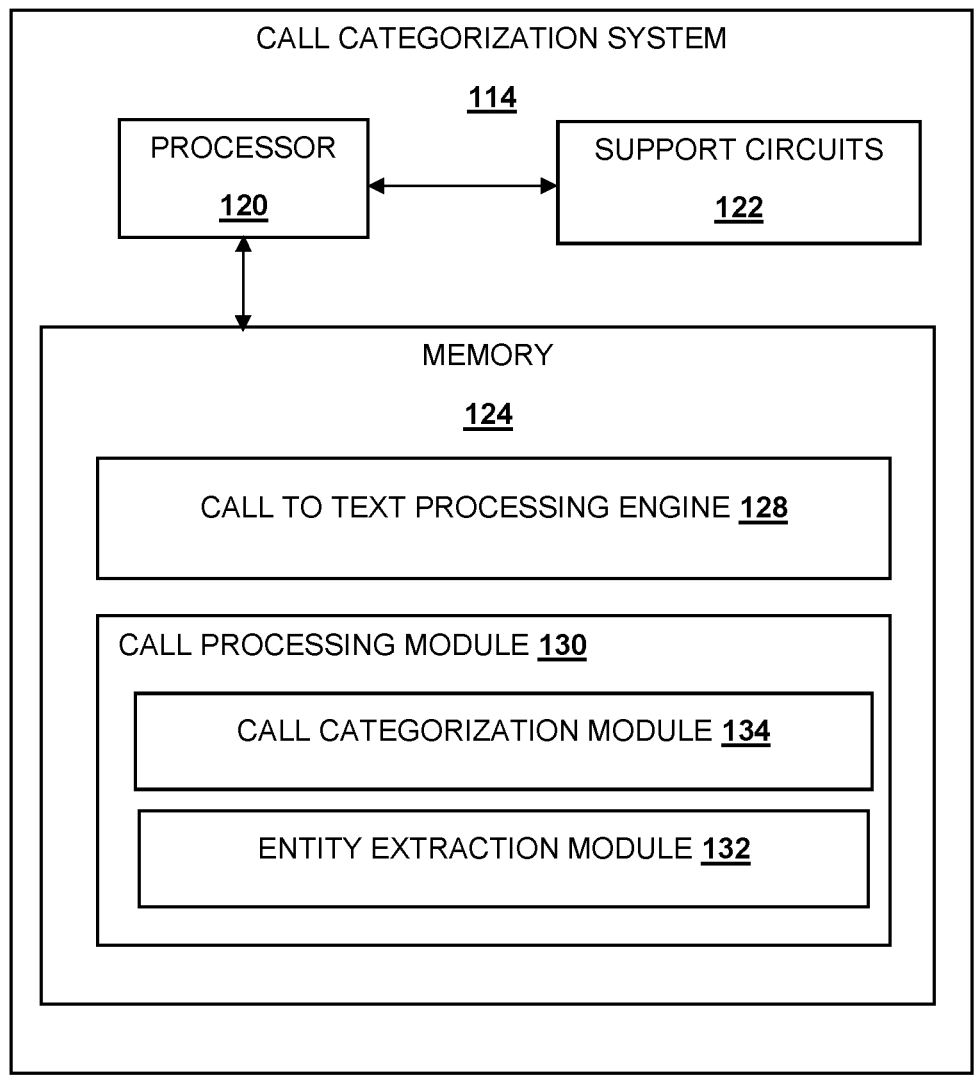
FIG. 1B is a block diagram of an automatic call categorization system of FIG. 1A, in accordance with an embodiment of the present invention.

FIG. 1B discloses the automatic call categorization system 114 in accordance with an embodiment of the present invention. The system 114 receives audio data from the real-time audio stream 108 of the call 102 and generates a text call summary output of the call 102 in real-time. The system 114 includes a processor 120 communicatively coupled to support circuits 122 and a memory 124. The processor 120 may be any commercially available processor, microprocessor, microcontroller, and the like. The support circuits 122 comprise well-known circuits that provide functionality to the processor 120, such as, a user interface, clock circuits, network communications, cache, power supplies, I/O circuits, and the like. The memory 124 is any form of digital storage used for storing data and executable software. Such memory includes, but is not limited to, random access memory, read only memory, disk storage, optical storage, and the like.

The memory 124 includes computer readable instructions corresponding to an operating system (not shown), a call to text processing engine 128, and a call processing module 130. The call to text processing engine 128 includes an automatic speech recognition (ASR) module, and is configured to transcribe audio data from an active call, generate text data of the call in real-time, annotate the text data with the names or generic placeholders of the parties on the call (e.g., the customer, the agent), to generate diarized text, as is well known in the art. The call to text processing engine 128 receives audio data 108 of the call 102 in real-time. The call to text processing engine 128 transcribes the audio data 108 to generate text data corresponding to the conversation between the caller 106 and the agent 104, in real-time. The transcription is performed using automatic speech recognition (ASR) techniques as generally known in the art.

The call processing module 130 further comprises an entity extraction module 132 and a call categorization module 134. The modules 130-134 include computer executable instructions, which when executed by the processor 120, perform the call categorization as described herein.

The entity extraction module 132 receives the text data generated by the call to text processing engine 128. The text data is also referred to as diarized text, diarized text data, or diarized input. The entity extraction module 132 extracts entities from the diarized text. The term "entities" are the portions of the text that help define what the call (e.g., the call 102) is about. The entities include various descriptors, such as names, for example, the name of a patient, a doctor, a provider, an insurance company, numbers, for example, amount of money (e.g., premium, deductible, co-pay), dates, for example, date of birth, date of visit, among others. Mandatory entities are expected to be present in all calls (or call documents), and are required to be extracted. Optional entities may or may not be present in all calls (or call documents). In general, by virtue of being 'optional', all optional entities are not present in a single call document. The entity extraction module 132 comprises a rule-base to identify relevant entities from a given text. In some embodiments, the entities may also be used by the call categorization module 134 for call categorization.

The call categorization module 134 comprises calculates a probability score for text data of a call (also, "call document"), based on a comparison of call document with known key words of call categories. The call categories are typically organized in a tree structure, or a top-down manner, which may be visualized as a tree structure, for example, as depicted in FIGS. 2A-2D. The call categorization module 134 is configured to conduct an analysis using probability calculations using a regressive (or bottom up) approach. That is, the call categorization module 134 is configured to calculate a probability of the call belonging to a class at a lowest or terminal level of the call category tree structure, and thereafter, calculating a probability of the call belonging to a class at a level just above the lowest level, and so on. In some embodiments, the call categorization module 134 is also configured to calculate probability of the call belonging to various categories in a top-down approach, that is, progressively moving from the top level of category to the next lower level of categories. In some embodiments, the call categorization module 134 identifies the call category using the regressive analysis of probability calculations, and additionally verifies the identified call category using the progressive analysis of probability calculations. Entity extraction and call categorization are discussed further below.

Entity extraction: as an example of entity extraction performed by the entity extraction module 134, a call (e.g., the call 102 of FIG. 1) between a customer and an agent (e.g., the customer 106 and the agent 104 of FIG. 1) is received by the call to text processing engine 128, for example, directly via a live stream (the stream 108), or from a storage entity, such as the data store 110. The call 102 is converted to a diarized text by the call to text processing engine 128, as shown below:

Agent: thank you for calling you Mark my name is Keith. please have your name and the need of a still that you're calling from.

Customer: Yaswanth calling from John Dempsey Hospital University of Connecticut.

Agent: I'm sorry wasn't in the hospital again.

Customer: John Dempsey Hospital University Connecticut.

Agent: Okay. call me if you said the patient's member ID number.

Customer: three five five six one six six one.

Agent: and the name and date of birth of the patient.

Customer: Abhilash Kumar. March twenty nineteen sixty eight

Agent: okay. so I did find the patient's account here. just came his future about trip.

Customer: I'm sorry.

Agent: are you calling for claims please read benefits

Customer: benefits.

Agent: for what CPT code.

Customer: one one zero nine seven one four zero nine seven. and five three nine seven.

Agent: I six. and the other day and know for the children.

Customer: diagnosis code is M like Marry. one two point seven seven.
Agent: okay. and it should be done at the office out Hospital
Customer: facility
Agent: outpatient facility.
Customer: yes.
In a next step, the diarized text is preprocessed to remove unwanted portions of the text, for example, unwanted punctuations, articles, or other words. In some embodiments, a reverse text normalization is conducted for specific type of data. Continuing the example, the following preprocessed diarized text is achieved:
Agent: thank you for calling you Mark my name is Keith please have your name and the need a still that you're calling from
Customer: Yaswanth calling from John Dempsey Hospital University Connecticut
Agent: I'm sorry wasn't in the hospital again
Customer: John Dempsey Hospital University Connecticut
Agent: Okay call me if you said the patient's member ID number
Customer: 35561661
Agent: and the name and date of birth of the patient
Customer: Abhilash Kumar Mar. 20, 1968
Agent: okay so I did find the patient's account here just came his future about trip
Customer: I'm sorry
Agent: are you calling for claims please read benefits
Customer: benefits
Agent: for what CPT code
Customer: 1109714097 and 5397
Agent: I six and the other day and know for the children
Customer: diagnosis code is M12 point 77
Agent: okay and it should be done at the office out Hospital
Customer: facility
Agent: outpatient facility
Customer: yes Of the above preprocessed text, the first few lines are designated as a call header section, and the last few lines are designated to be a call end section. For example, the following may be designated as the call header and the call end sections:
CALL HEADER
Agent: thank you for calling you Mark my name is Keith please have your name and the need a still that you're calling from
Customer: Yaswanth calling from John Dempsey Hospital University Connecticut
Agent: I'm sorry wasn't in the hospital again
Customer: John Dempsey Hospital University Connecticut
CALL END/CALL TAIL
Customer: facility
Agent: outpatient facility
Customer: yes
The portion of the text in between the call header and the call tail is also referred to as the call body. The call header section is used to identify one or more mandatory entities, for example, the customer name ("Yaswanth") and the customer institution ("John Dempsey Hospital University"). According to some embodiments, the call header and call end sections are extracted according to a fixed text length, for example based on the number of words, the number of lines (viz., the number of exchanges between the customer and the agent). In some embodiments, the call header section is defined as the first few lines of text, for example, first five lines of exchange between the speakers. In some embodiments, the call end section is defined as the last few lines of text, for example, last three lines of exchange between the speakers. In other embodiments, the selected length for call header and call end sections may vary further.

The call header and the call body are processed for entity extraction by the entity extraction module 132. In some embodiments, the call end part is not processed by the entity extraction module 132, reducing the processing load on the system 114. Entities from any portion of the call (header, body or tail) are extracted using various rules or set of rules.

For example, entities such as names are extracted using two different rule sets, namely, a customer's direct reply stating his or her name, and an agent's question followed by the customer's reply. The customer's direct response is prioritized in the rule-set, and only if the customer's name is not found in the direct response from the customer, the Agent's question on name and the customer's corresponding reply is looked at.

As an example, customer's direct response phrases are expected to include the customer name where the character "_" is shown in the following text.
Hi my name is _
Hi my first name is _
Hey this is _
Hi _
As an example, the customer's reply to a question asked by the agent is shown by the following text.
Agent: "May I know who I am speaking with"; Customer: "Somnath Roy"
Agent: "Am I speaking with Somnath"; Customer: "Yes"
As another example, entities such as number entities, such as dates or amounts, are extracted using four different rule sets, illustrated as examples. The first rule is to use a customer's direct response, for example, when a customer states "This call is regarding a claim amount of two thousand five hundred and fifty cents." The second rule is to use an agent's response to a customer's question. For example, when a customer asks "Can you tell me my individual deductible," and the agent replies "it's fifteen hundred dollars." The third rule is to use a customer's response to an agent's question. For example, the agent asks "How much you spent for family deductible," and the customer replies "Three thousand dollars." The fourth rule is to use the agent's direct response, for example, "You have already met the deductible amount of five hundred dollars."

The rules are configured to look for words for phrases generally used in the context of the conversation, for example, the word "name," as shown by the text examples above, or similar conversational phrases generally used, for example, "I am," in order to identify the customer name. In case of a name being identified, its first letter is capitalized to assist with entity extraction. For example, in two similar sentences, "I am fine" and "I am Roy," the name would be extracted from the second instance only because it consists of a capitalized word. Similarly, rules for extracting number entities are configured to look for words or phrases typically used in the context of such numbers, such as "date," "month," "year," "day," or "money," "dollars," "deductible," "co-pay," among others. Machine learning (ML) or Artificial Intelligence (AI) techniques used to extract entities would typically not distinguish between entities according to context. For example, at best, AI/ML techniques may yield five different names if five different names are uttered in an exchange. However, in order to identify which name belongs to that of the patient, a context based rules will still be needed. In contrast, the rule based approach discussed above incorporates the context based rules, and identify the entities accurately, and are therefore, more efficient than such AI/ML techniques.

Figure 2A:
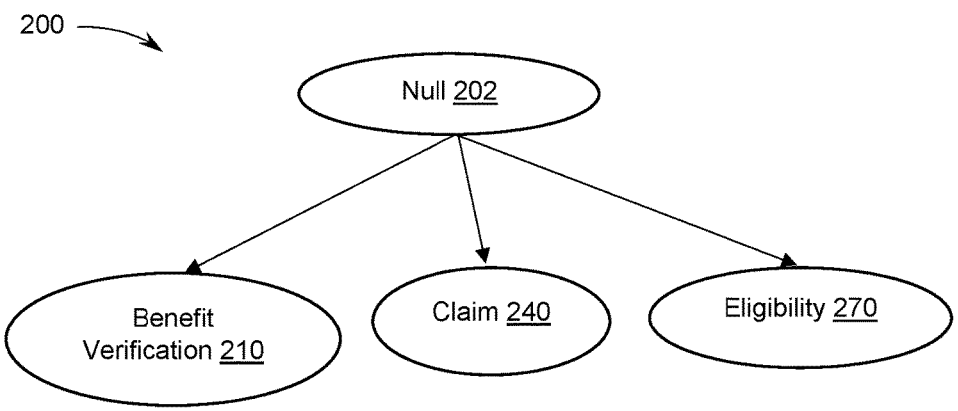
FIGS. 2A-2D depict a tree structure diagram of call categories, in accordance with an embodiment of the present invention.
Figure 2B:
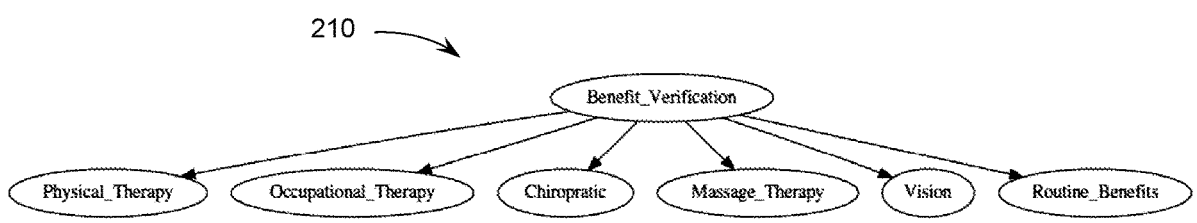

Call Categorization: In addition to extracting entities from the call document, the call needs to be summarized by classifying it in the correct category or class, for example, as implemented by the call categorization module 132. FIGS. 2A-2D depict an example of call classes (categories and subcategories thereof) relevant to healthcare insurance domain, the call classes arranged in a top-down, tree structure. Each call class is located at a node of the tree structure, and may also be referred to as a node. In the example, the classes Benefit Verification 210, claim 240 and Eligibility 270 are the top most level or level 1 (e.g., FIG. 2C), and for the purpose of this discussion, also referred to as the top most node, the root node, or the top most class. It is noted that "Null" is not a class/node, rather used for brevity of the drawings, and to indicate that the nodes Benefit Verification 210, claim 240 and Eligibility 270 are at the same, top most level. As can be seen from FIG. 2C, level 1 category claim 240 has two child nodes or classes, "status" and "review," which is also referred to as level 2, which is the next lower level after level 1. The "claim" class is also referred to as a parent or ancestor of the child classes "status" and "review." Similarly, the call categories under "status" (e.g., "denied," "paid," "other") or under "review" (e.g., "appeal") are level 3, and the categories under the categories of level 3 are referred to as level 4 categories, and in this case, level 4 categories are at the lower most level, and are also referred to as terminal nodes or terminal classes. Each class has one or more associated key words or phrases. The associated key words or phrases are typical to calls of that category, and therefore, such key words or phrases are usable to identify the call categories. All key words or phrases for a lower level category, for example, "accident_details" of level 4 are included in the corresponding higher level category, which, in this example, is "denied" of level 3. Similarly, all key words or phrases of "timely_filing" (level 4) would be included in "denied" (corresponding node at level 3), and key words or phrases for "adjustment" would be included in "paid" (corresponding node at level 3). The classes are segregated along the tree structure, and accordingly, the key words or phrases for each class also get segregated by the tree structure. However, in some cases, there may be some or significant overlap in key words or phrases of different classes, which may be incidental. While the root node class 240 has been explained in detail, root nodes benefit verification 210 and eligibility 270 are similarly organized, as depicted in FIGS. 2B and 2D, respectively.

As an example of call categorization, for example, performed by the call categorization module 132, a call (e.g., the call 102 of FIG. 1) between a customer and an agent (e.g., the customer 106 and the agent 104 of FIG. 1) is received by the call to text processing engine 128, for example, directly via a live stream (the stream 108), or from a storage entity, such as the data store 110. The call 102 is converted to a diarized text (call document) by the call to text processing engine 128, which is received as an input for the call categorization module 132. In some embodiments, speech tags such as "Agent," "Customer" are removed from the call document text.

The call categorization module 132 comprises a list of key words or phrases ("identifiers") corresponding to each class of FIGS. 2A-2D. The list of key words or phrases includes words or phrases that are associated with a particular class. That is, use of such key words or phrases in call is considered indicative of the call being relevant to the class associated with such key words or phrases. The categories are organized in a top-down or tree structure, and a parent class includes all the identifier key words or phrases of its child class(es).

The call categorization module 132 receives the call document (diarized and normalized text of the call), and generates a list of n-grams using the call document. According to some embodiments, the call categorization module 132 generates a list of n-grams for $1<=n<=6$. For example, the phrase "john calling jane regarding insurance query" has six words. The 1-gram refers to each of the individual words in a phrase, which in this example are, john, calling, jane, for, insurance, query. The 2-gram refers to phrases having two continuous words, which in this example are, john calling, calling jane, jane regarding, regarding insurance, insurance query. In this manner, 3-grams, 4-grams, 5-grams and 6-grams (which is the entire six word phrase) are generated by the call categorization module 132. The total number of n-grams generated from the call document is denoted by "T."

The call categorization module 132 compares the n-grams generated from the call document to the identifier key words or phrases for all classes. When a match is found for a class, the count for that class is increased by 1. The comparison and matching process above is repeated for all n-grams and all classes, and in this manner, count of key words or phrases of a class matching the n-grams of the call document (or count-gram) is generated by the call categorization module 132. The count for a particular class is denoted by "N(class)."

The call categorization module 132 calculates the probability for a class, denoted by "P(class)" as:

P(class)=N(class)/T

Figure 2C:
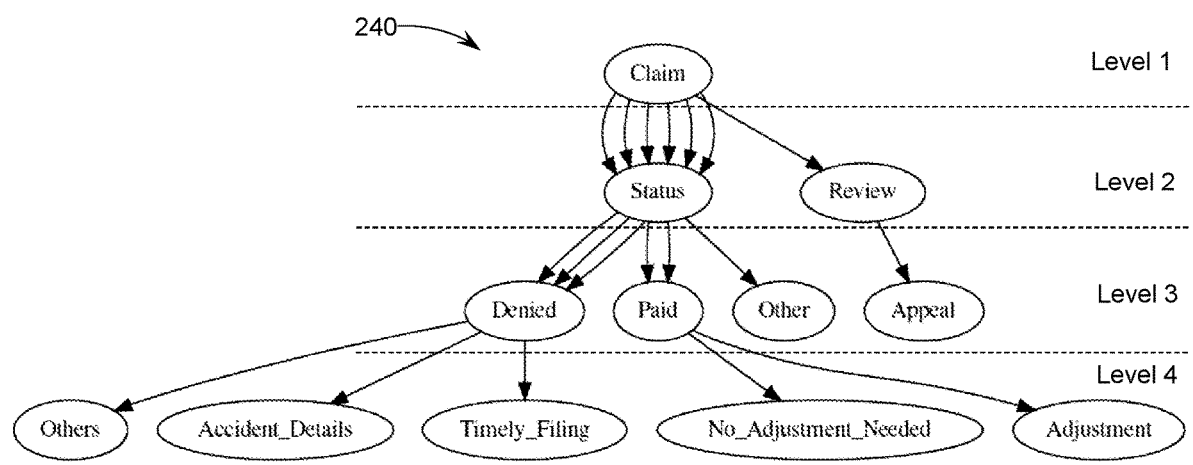
Figure 2D:
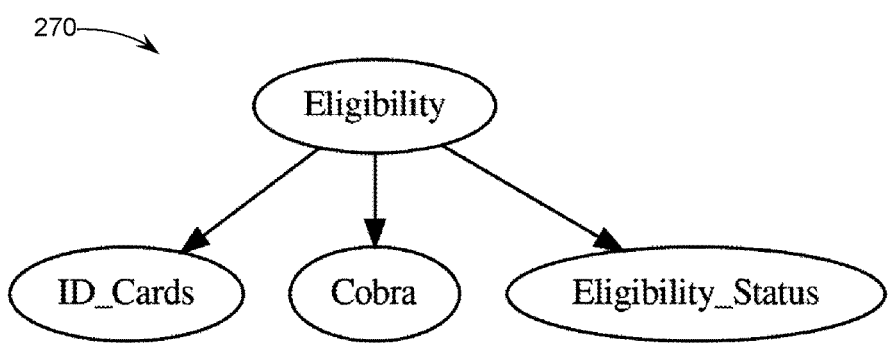

In operation, the call categorization module 132 identifies the highest probability scores from the probability scores of the terminal classes or nodes, for example, for the root node class 240 of FIG. 2C, the terminal classes or nodes are Other, Accident Details, Timely Filing, No Adjustment Needed, Adjustment, Other and Appeal. The class or classes having the highest probability is/are identified as a winning class(es).

According to some embodiments, if a single terminal class is a clear winner, then probability of all nodes at the next higher level, which have a common ancestor, is calculated. Such a regressive probability calculation is conducted for a predefined number of levels. According to some embodiments, the number of levels at which the probability is calculated in regressive manner is given by ceiling{tree height/2}, where tree height refers to the maximum number of levels from the root node to a terminal node, and ceiling{ } refers to the ceiling function, which rounds up a fraction to the closest higher integer. In the illustration of FIG. 2C, there are terminal nodes at level 3 as well as level 4, and since the maximum number of levels is 4, the tree height is 4, and using the above formula, the regressive probability analysis is conducted for ceiling{4/2}=ceiling{2}=2 levels.

For example, if in FIG. 2C, terminal class or node Accident Details is a clear winner, then the regressive analysis will be conducted for 2 levels, starting at the terminal level 4, that is for level 4 and level 3. Since Accident Details is the winner at level 4, probability at the next higher level, level 3 is calculated for verification. Level 3 includes four nodes Denied, Paid, Other and Appeal. Of the four nodes, three nodes, Denied, Paid and Other have a common ancestor, Status, at level 2. Therefore, probability scores of Denied, Paid and Other are calculated. In such a calculation, the count of n-grams match for the other class at level 2, Review, and its child classes are excluded, reducing the search space significantly, and improving the calculation efficiency. It is expected that the parent of the winning terminal node Accident Details, which is Denied, would have the highest probability among Denied, Paid and Other, and if the calculation confirms that Denied has the highest probability, then the call categorization module 134 determines that Denied>Accident Detail as classification, and further determines the path up to the root node as the call category. Particularly, the call categorization module 134 determines Claim>Status>Denied>Accident Details as the call category, and presents the call category, for example, on the GUI 112.

According to some embodiments, if the parent of the winning terminal class, Accident Details, is not a winner at the next higher level, and another class, say Paid, at level 3 having a common ancestor as Denied is a winner, then the call categorization module 134 presents the both Denied and Paid on the GUI 112 for a user to select.

According to some embodiments, if two or more classes at the terminal level, have tied scores then, the probability calculation at the next higher level is used to determine the winner. If in FIG. 2C, Accident Details and Adjustment, each of which is a terminal class at level 4, and have parents (Denied and Paid, respectively) with a common ancestor (Status), and both Accident Details and Adjustment have the same probability score, then, probability of the parents, Denied and Paid are compared to determine a winner. In the calculation of the probability of Denied and Paid, the count of n-grams match for the other class at level 2, Review, and its child classes are excluded, reducing the search space significantly, and improving the calculation efficiency. If, for example, the probability score of Paid is higher than that of Denied, then the call categorization module 134 determines that Paid>Adjustment is the call category, and further determines the path up to the root node as the call category. Particularly, the call categorization module 134 determines Claim>Status>Paid>Adjustment as the call category, and presents the call category, for example, on the GUI 112.

According to some embodiments, if a clear winner is not determined using the above techniques, then the call categorization module 134 presents the closest option(s) on the GUI 112 for a user to select.

According to some embodiments, in the examples discussed above, the call categorization module 134 calculates the probability of the root nodes, Benefit Verification, Claim and Eligibility for verifying the results obtained using the regressive probability analysis. In the example in which the call category is determined to be Claim>Status>Paid>Adjustment, if Claim is the winner in such a probability calculation, the call categorization module 134 determines that the call categorization based on regressive probability calculation is verified. If however, Claim is not the winner, then the determined call category, Claim>Status>Paid>Adjustment, as well as the winning class at the root level is presented by the call categorization module 134 on the GUI 112.

In some embodiments, the call categorization module 132 is also configured to implement a top-down or progressive analysis of probability scores, to verify the results obtained using the regressive probability analysis. The call categorization module 132 conducts progressive probability analysis in a manner similar to the regressive probability analysis explained above, except that the analysis begins at the top-most (or root) level of the tree structure. For example, the call categorization module 134 calculates the probabilities for Benefit Verification, Claim and Eligibility. The call categorization module 132 counts the number ("N(class)") of n-grams matching the key words or phrases for each class, and calculates the probability for each class ("P(class)") as:

P(class)=N(class)/T where T is the total number of n-grams in the call document, $1<=n<=6$.

The call categorization module 132 identifies the highest probability value from the probability scores of the root classes, and the class having the highest probability is identified as the winner. If a clear winner is established, then that class is considered to be accurate. If however, a clear winner is not established, (e.g., the scores are identical or close within a pre-defined threshold), then the call categorization module 132 proceeds to analyze probability scores for child nodes or classes corresponding to the winning node. In calculating the probability scores of the child classes, the child classes of the parent classes other than the winning classes are excluded from the probability score calculation. The analysis, as discussed above, proceeds to lower levels to identify the node or class with the highest probability at each level, till a terminal class is reached. The call is categorized according to the highest probability class as each level, and for example, if at level 2, the probability of "status" was higher than "review" and at level 3, then, in calculation of the probabilities at level 3, the key words or phrases related to "review" and "appeal" (the non-winning classes) would be excluded, thereby pruning the search space and increasing processing efficiencies. Further, if the probability of "other" is higher than "denied" or "paid" at level 3, and since "other" is a terminal node, the call is categorized as Claim>Status>Other.

According to some embodiments, only the winning class at the root level is used to validate the call categorization obtained using the regressive approach discussed above. For example, in the regressive approach above, if the call is categorized as Claim>Status>Other, and in the current progressive approach, the probability score of Claim is higher than the probability score of Benefits Verification, then the call categorization module 134 determines that the progressive probability analysis validates that Claim is the right category.

According to some embodiments, a complete result (or a portion thereof) of the progressive probability analysis is used to verify the result (or a portion thereof) obtained using the regressive probability analysis. For example, if using the regressive probability analysis, the call is categorized as "Claims>Status>Denied>Accident Details," a verification is made with a progressive probability analysis of the top two classes, for example, "Claims>Status." It is expected that both "claims" and "status" would have the highest probability at their respective levels, and in such a case, the call categorization determined using the regressive probabilistic approach is considered as verified using the progressive probabilistic approach. However, if there is an ambiguity at a higher level of classes, say, at "claims," then, if the probability score of the child class, that is, "status" is a clear winner, then the call categorization is considered verified. At the end of the analysis, if an ambiguity persists, and the call categorization module 132 is unable to determine a clear winner, and therefore, unable to determine the call category (all classes and sub-classes) with certainty, the call categorization module 132 presents the competing options and other pertinent details (e.g., extracted entities). In some embodiments, the call categorization module presents such information on the GUI 112 of FIG. 1 for manual decision making, for example, by an agent.

Figure 3:
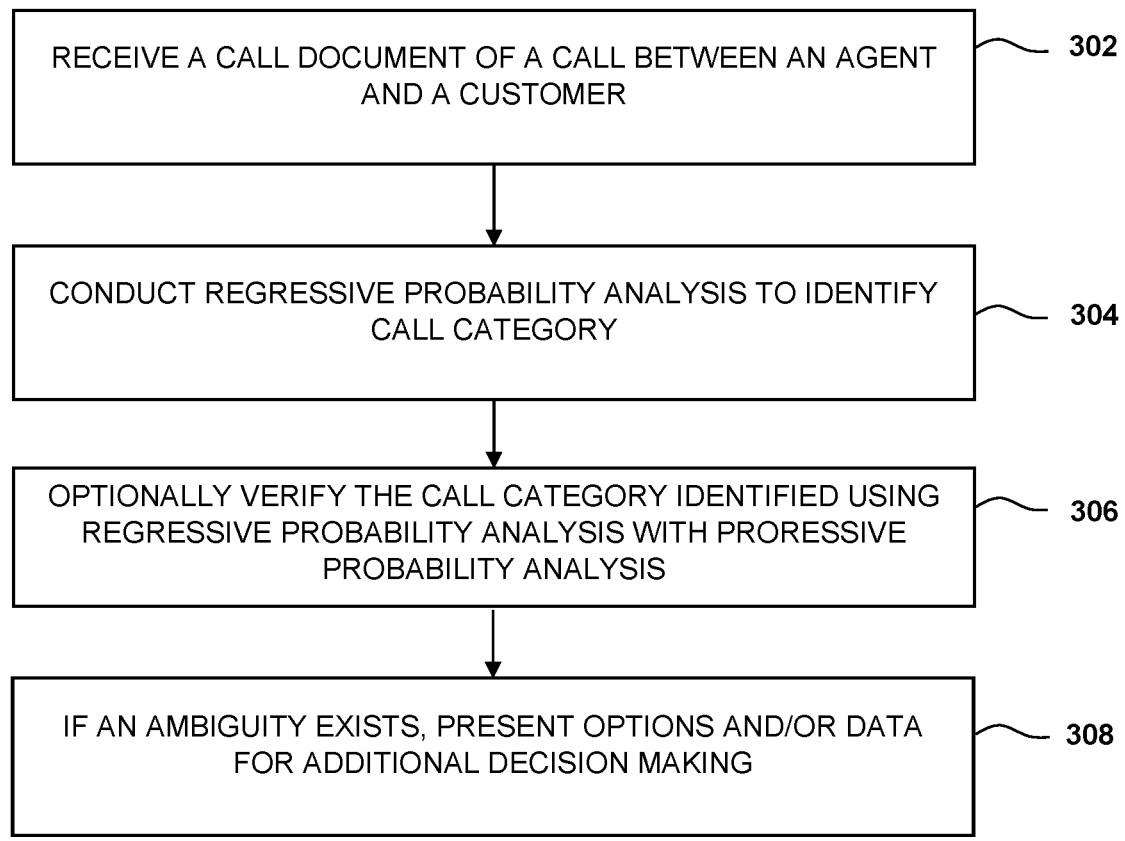
FIG. 3 is a flow diagram of a method of identifying a call category, in accordance with an embodiment of the present invention.

FIG. 3 depicts a method 300 for call categorization, for example, as implemented by the call categorization module 132 of FIG. 1B. At step 302, the method 300 receives a call document of the call (e.g., the call 102), and at step 304, the method 300 conducts a regressive probability analysis to identify call category(ies), as discussed above in detail. In some embodiments, the method 300 includes a step 306, at which the method 300 conducts a progressive probability analysis as discussed above, and compares the results to verify that the results of the regressive probability analysis are correct. In some embodiments, the verification involves comparing fewer than all the levels of categories between the results of progressive probability analysis and the regressive probability analysis. For example, the method 300 determines at step 304, using the regressive probability analysis, the call categories across four levels as: Claim>Status>Paid>Adjustment.

At step 306, the method 300 uses determines call categories up to four levels using the progressive probability analysis, for verification of the call categories determined at step 304. That is, the method 300 may determine call categorization across only level 1 (Claim), up to level 2 (Claim>Status), up to level 3 (Claim>Status>Paid), or up to level 4 (Claim>Status>Paid>Adjustment) using progressive probability analysis, and compare with the results of the regressive probability analysis from the step 304. According to some embodiments, progressive probability analysis based categorization up to level 1, level 2, level 3 or level 4 is used to verify the call categorization of step 304. According to some embodiments, if call categorization of step 304 cannot be verified using the verification of step 306, then at step 308, the method 300 presents options for additional decision making. For example, the method 300 may present the call categorizations determined at step 304 (regressive probability analysis) and at step 306 (progressive probability analysis), and optionally additional data, such as entities, relevant portions of the call text, to a user, via the GUI 112. The user may then make a decision to select one of the presented options, or may define a new call categorization. In most instances, the method 300 provides an accurate call categorization, with a significantly efficient processing power utilization.

Figure 4:
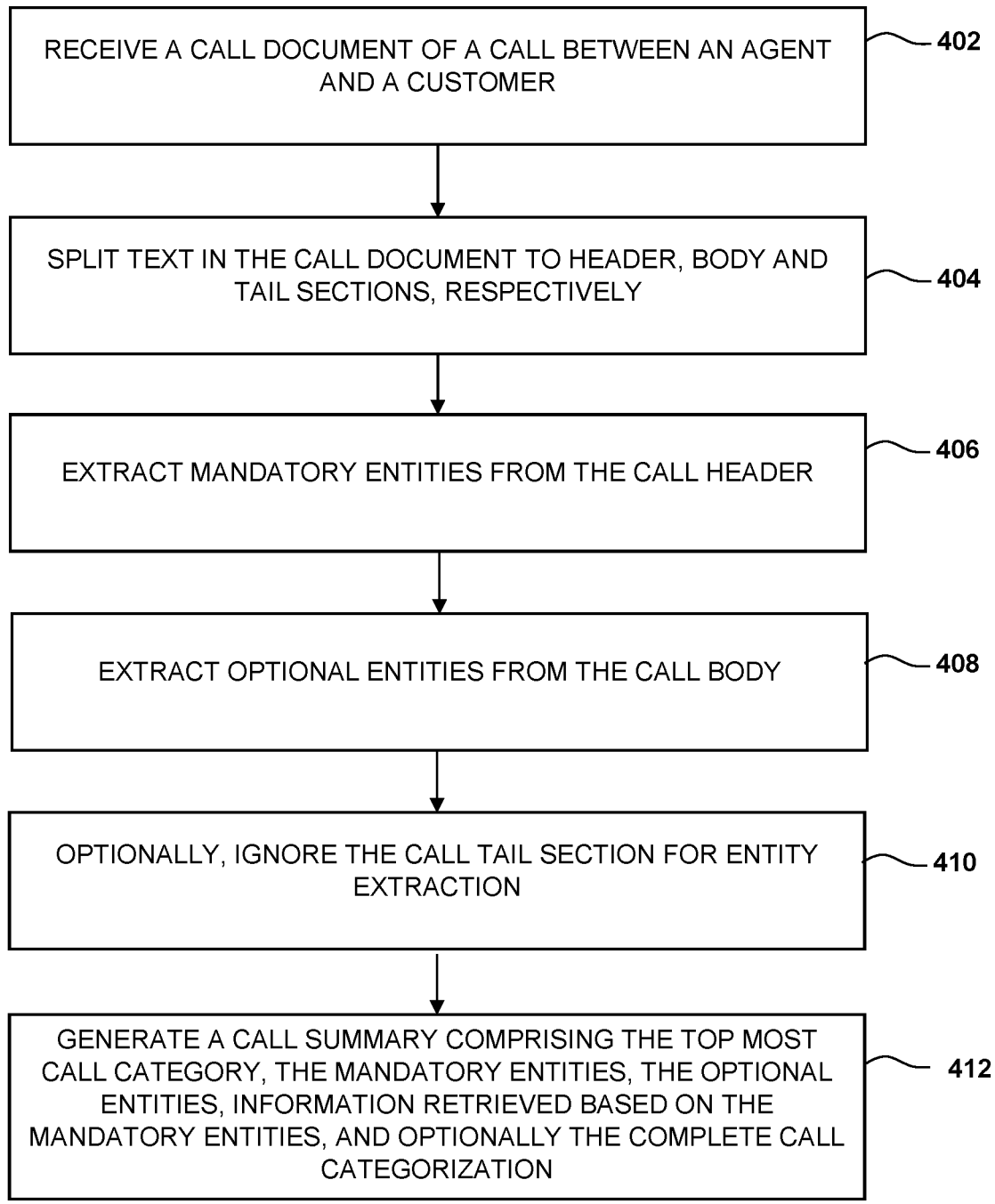
FIG. 4 is a flow diagram of a method of call categorization, in accordance with an embodiment of the present invention.

FIG. 4 depicts a method 400 for entity extraction, for example, as implemented by the entity extraction module 134 of FIG. 1B. At step 402, the method 400 receives a call document of the call (e.g., the call 102), and at step 404, the method 400 splits the text of the call document to call header, a call body and a call end or call tail. At step 406, the method 400 extracts mandatory entities from the call header, and at step 408, the method 400 extracts optional entities from the call body, for example, as discussed above. At step 410, the method optionally ignores the call tail for entity extraction, reducing the search space. At step 412, the method 400 generates a call summary. The call summary includes one or more of call categorization (from only the broadest or top most level, through to various lower or sub-levels), mandatory entities, optional entities, or additional information or data based on mandatory entities.

Figure 5:
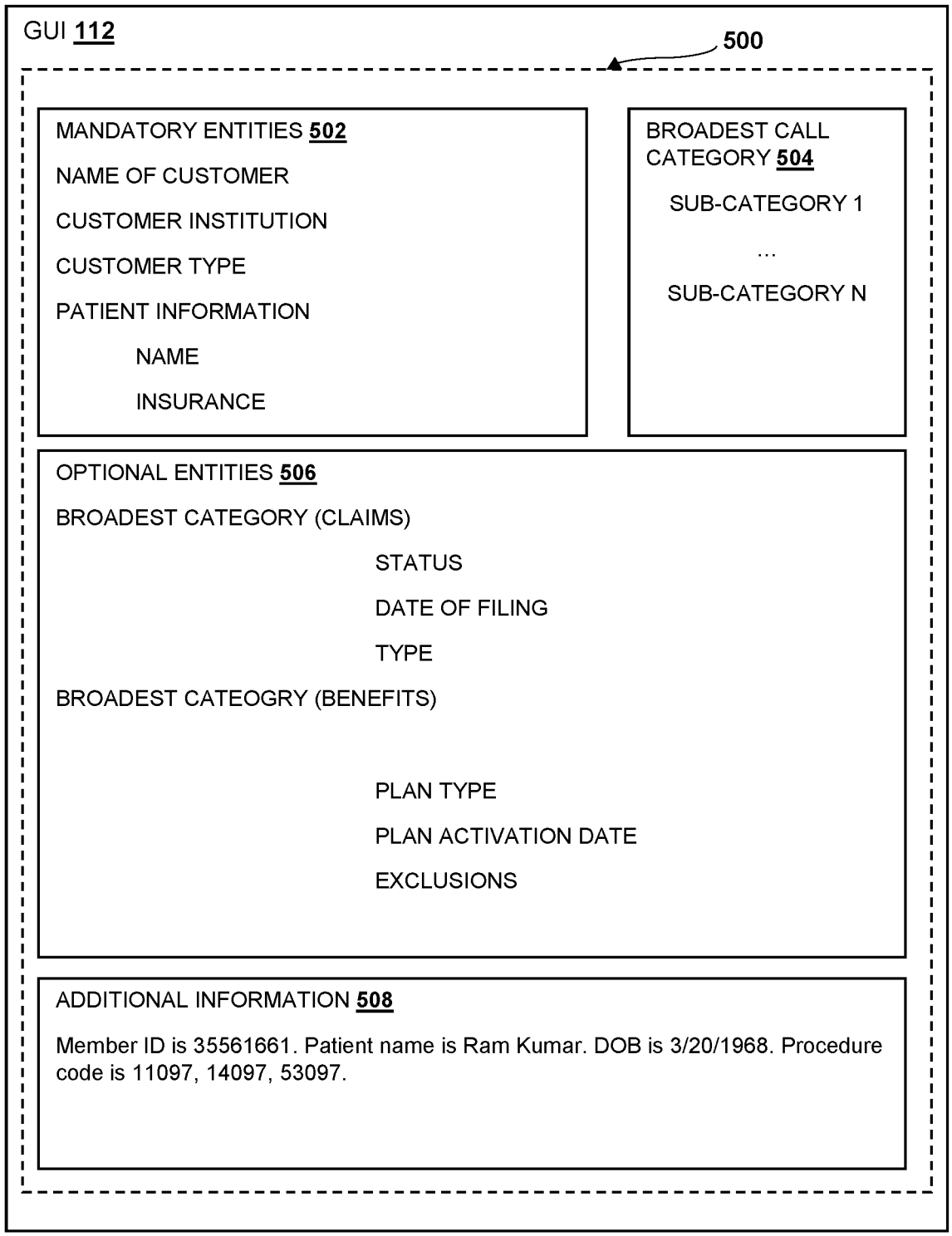
FIG. 5 depicts a graphical user interface (GUI) generated by the call categorization system, in accordance with an embodiment of the present invention.

FIG. 5 depicts a call summary 500, for example, the call summary generated at the step 412, presented on the GUI 112. The call summary 500 comprises mandatory entities 502, broadest call category 504, optional entities 506 and additional information 508 based on the mandatory entities.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

We claim:

1. A system for categorizing a call between an agent and a caller, the system comprising:
   at least one processor; and
   a memory communicably coupled to the at least one processor, the memory comprising computer executable instructions, which, when executed by the at least one processor implement the method comprising:
   receiving a call document comprising text of the call between the agent and the caller;
   categorizing the call into a single terminal class from at least one terminal class in a tree-structure of call classes, and one parent of the single terminal class using regressive probability analysis of the call document;
   splitting the call document to at least two portions, the at least two portions comprising a call header and a call body;
   extracting, using rule-based entity extraction, a mandatory entity from the call header and an optional entity from the call body; and
   presenting, on a graphical user interface, the summary comprising the at least one class, the mandatory entity and the optional entity.

2. The system of claim 1, wherein the regressive probability analysis comprises:
   calculating a probability of the call document with respect to the at least one terminal class in a tree-structure of call classes;
   identifying, from the at least one terminal class, the single terminal class with the highest probability score as a winner;
   calculating the probability of a parent of the winning terminal class, and of other classes having the same ancestor as that of the parent;
   identifying the parent of the winning terminal class as the winner among the parent and the other classes having the same ancestor as that of the parent; and
   determining the call category as the winning parent and the winning terminal class.

3. The system of claim 1, wherein the method further comprises verifying the at least one class using progressive probability analysis of the call document,
   wherein the progressive probability analysis comprises:

calculating a probability of the call document with respect to at least one top-most class in a tree-structure of call classes;

identifying, from the at least one top-most class, a top-most class with the highest probability score as a winner;

calculating a probability of the call document with respect to at least one child class of the winning top-most class;

identifying, from the at least one child class, a child class with the highest probability score as the winner;

determining the call category as the winning top-most class and the winning child class.

4. The system of claim 1, wherein the rule-based entity extraction comprises identifying text from the call document as relevant for extracting an entity based on an anticipated phrases in the context of the conversation.

5. The system of claim 4, wherein the at least two portions comprises a call tail, and wherein the method comprises excluding the call tail from the extracting.

6. A method for categorizing a call between an agent and a caller, the method comprising:

receiving, on a call categorization system, a call document comprising text of the call between the agent and the caller;

categorizing the call into a single terminal class from at least one terminal class in a tree-structure of call classes, and one parent of the single terminal class using regressive probability analysis of the call document;

splitting the call document to at least two portions, the at least two portions comprising a call header and a call body;

extracting, using rule-based entity extraction, a mandatory entity from the call header and an optional entity from the call body; and presenting, on a graphical user interface, the summary comprising the at least one class, the mandatory entity and the optional entity.

7. The method of claim 6, wherein the regressive probability analysis comprises:

calculating a probability of the call document with respect to the at least one terminal class;

identifying, from the at least one terminal class, the single terminal class with the highest probability score as a winner;

calculating the probability of a parent of the winning terminal class, and of other classes having the same ancestor as that of the parent;

identifying the parent of the winning terminal class as the winner among the parent and the other classes having the same ancestor as that of the parent; and determining the call category as the winning parent and the winning terminal class.

8. The method of claim 6, further comprising verifying the at least one class using progressive probability analysis of the call document, wherein the progressive probability analysis comprises:

calculating a probability of the call document with respect to at least one top-most class in a tree-structure of call classes;

identifying, from the at least one top-most class, a top-most class with the highest probability score as a winner;

calculating a probability of the call document with respect to at least one child class of the winning top-most class;

identifying, from the at least one child class, a child class with the highest probability score as the winner;

determining the call category as the winning top-most class and the winning child class.

9. The method of claim 6, wherein the rule-based entity extraction comprises:

identifying text from the call document as relevant for extracting an entity based on an anticipated phrases in the context of the conversation.

10. The method of claim 9, wherein the at least two portions comprises a call tail, and wherein the method comprises excluding the call tail from the extracting.

11. A non-transitory computer readable medium comprising computer readable instructions that, when executed by a computer, cause the computer to:

receive, on a call categorization system, a call document comprising text of the call between the agent and the caller;

categorize the call into a single terminal class from at least one terminal class in a tree-structure of call classes, and one parent of the single terminal class using regressive probability analysis of the call document;

split the call document to at least two portions, the at least two portions comprising a call header and a call body;

extract, using rule-based entity extraction, a mandatory entity from the call header and an optional entity from the call body; and present, on a graphical user interface, the summary comprising the at least one class, the mandatory entity and the optional entity.

12. The non-transitory computer readable medium of claim 11, wherein the regressive probability analysis comprises:

calculating a probability of the call document with respect to the at least one terminal class;

identifying, from the at least one terminal class, the single terminal class with the highest probability score as a winner;

calculating the probability of a parent of the winning terminal class, and of other classes having the same ancestor as that of the parent;

identifying the parent of the winning terminal class as the winner among the parent and the other classes having the same ancestor as that of the parent; and determining the call category as the winning parent and the winning terminal class.

13. The non-transitory computer readable medium of claim 11, further comprising verifying the at least one class using progressive probability analysis of the call document, wherein the progressive probability analysis comprises:

calculating a probability of the call document with respect to at least one top-most class in a tree-structure of call classes;

identifying, from the at least one top-most class, a top-most class with the highest probability score as a winner;

calculating a probability of the call document with respect to at least one child class of the winning top-most class;

identifying, from the at least one child class, a child class with the highest probability score as the winner;

determining the call category as the winning top-most class and the winning child class.

14. The non-transitory computer readable medium of claim 11, wherein the rule-based entity extraction comprises:
   identifying text from the call document as relevant for extracting an entity based on an anticipated phrases in the context of the conversation.

15. The non-transitory computer readable medium of claim 14, wherein the at least two portions comprises a call tail, and wherein the method comprises excluding the call tail from the extracting.

* * * * *